United States Patent
Yoshida et al.

(10) Patent No.: US 10,267,616 B2
(45) Date of Patent: Apr. 23, 2019

(54) DISPLACEMENT SENSOR AND DISTANCE ADJUSTMENT APPARATUS

(71) Applicant: Japan System Development Co., Ltd., Tokushima (JP)

(72) Inventors: Yoshiichi Yoshida, Tokushima (JP); Hiroki Tomino, Tokushima (JP)

(73) Assignee: JAPAN SYSTEM DEVELOPMENT CO., LTD., Tokushima (JP)

( * ) Notice: Subject to any disclaimer, the term of this patent is extended or adjusted under 35 U.S.C. 154(b) by 0 days.

(21) Appl. No.: 15/545,089

(22) PCT Filed: Nov. 7, 2016

(86) PCT No.: PCT/JP2016/082960
§ 371 (c)(1),
(2) Date: Jul. 20, 2017

(87) PCT Pub. No.: WO2017/086200
PCT Pub. Date: May 26, 2017

(65) Prior Publication Data
US 2017/0370694 A1 Dec. 28, 2017

(30) Foreign Application Priority Data
Nov. 17, 2015 (JP) .................. 2015-224695

(51) Int. Cl.
*G01B 7/14* (2006.01)
*G01D 5/20* (2006.01)
(Continued)

(52) U.S. Cl.
CPC ............... *G01B 7/14* (2013.01); *G01B 7/003* (2013.01); *G01B 7/023* (2013.01); *G01D 5/2006* (2013.01); *G05D 3/12* (2013.01)

(58) Field of Classification Search
CPC .......... G01B 7/14; G01B 7/023; G01B 7/003; G01D 5/20; G01D 5/2006; G01D 5/0215;
(Continued)

(56) References Cited

U.S. PATENT DOCUMENTS

| 4,267,508 A * | 5/1981 | Ando ................... H01F 27/008 324/207.12 |
| 8,427,138 B2 * | 4/2013 | Okada ................... G01B 7/003 324/207.15 |

(Continued)

FOREIGN PATENT DOCUMENTS

| JP | 5-129833 | 5/1993 |
| JP | 2002-148003 | 5/2002 |

(Continued)

OTHER PUBLICATIONS

International Search Report dated Jan. 31, 2017 in International Application No. PCT/JP2016/082960.

*Primary Examiner* — Thang X Le
(74) *Attorney, Agent, or Firm* — Wenderoth, Lind & Ponack, L.L.P.

(57) ABSTRACT

A displacement sensor includes a coil, an inverter electrically connected to the coil, the inverter being configured to generate an oscillation signal, a reducer electrically connected between the coil and an output terminal of the inverter, the reducer being configured to reduce the strength of the oscillation signal, and a frequency detector electrically connected to the inverter, the frequency detector being configured to detect an oscillation frequency of an oscillator circuit in response to a distance between a measurement target and the coil, the oscillator circuit including the coil, the inverter, and the reducer and having an oscillation frequency of 30 MHz or higher.

13 Claims, 11 Drawing Sheets

(51) Int. Cl.
*G01B 7/00* (2006.01)
*G01B 7/02* (2006.01)
*G05D 3/12* (2006.01)

(58) Field of Classification Search
CPC . G01D 5/202; G05D 3/12; G01V 3/10; B60R 21/013; B60R 21/0134; B60R 21/34
See application file for complete search history.

(56) References Cited

U.S. PATENT DOCUMENTS

| | | | |
|---|---|---|---|
| 9,194,688 B2 * | 11/2015 | Thoss | G01B 7/14 |
| 9,752,899 B2 * | 9/2017 | Goto | G01D 5/2258 |
| 2008/0290861 A1 * | 11/2008 | Niwa | G01D 5/202 |
| | | | 324/207.16 |
| 2014/0241852 A1 * | 8/2014 | Fuller | F01D 21/003 |
| | | | 415/1 |
| 2017/0248443 A1 * | 8/2017 | Hrubes | G01D 5/20 |

FOREIGN PATENT DOCUMENTS

| | | |
|---|---|---|
| JP | 2006-222675 | 8/2006 |
| JP | 2009-192385 | 8/2009 |

\* cited by examiner

DISPLACEMENT SENSOR AND DISTANCE ADJUSTMENT APPARATUS

TECHNICAL FIELD

The present invention relates to a displacement sensor that measures the distance to a measurement target and a distance adjustment apparatus.

The subject application claims priority based on the Japanese patent application No. 2015-224695 filed on Nov. 17, 2015, and incorporates by reference herein the content thereof.

BACKGROUND ART

A displacement sensor using an oscillator circuit has been known as a displacement sensor that measures the distance to a measurement target such as metal. In the displacement sensor, an oscillator circuit and an integrating circuit are mounted on a board that has a coil. In the displacement sensor, because the oscillation frequency of the oscillator circuit varies in accordance with the change in the distance between the coil and the measurement target, the distance to the measurement target is measured by detecting the oscillation frequency.

Because such a sensor radiates harmonics (noise), it must meet standardized EMC (electromagnetic compatibility) standards. For that reason, in the environment in which a displacement sensor has been used, the entire sensor, including the measurement target, needed to be shielded, so that the harmonics radiated by the displacement sensor did not leak to the outside. However, in the method of shielding the entire displacement sensor in this manner, there have been cases in which the shielding material cost and manufacturing cost and the like increased. Also, depending upon the environment in which the displacement sensor is used, there have been cases in which it was not possible to shield the entire displacement sensor. If a constituent element (noise-reduction means) is provided within the circuit in order to reduce the harmonics, not only the harmonics, but also the fundamental waveform used in distance measurement is affected. For that reason, in the displacement sensor field the provision within the displacement sensor of an element to reduce harmonics has not been done. Also, in a displacement sensor using an LC oscillator circuit, if measurement is done using an oscillation frequency in the order of megahertz, the strengths of both the fundamental waveform used in measurement and the harmonics increase, so that there have been cases in which it was difficult to meet EMC standards.

PRIOR ART REFERENCES

Patent References

Patent Reference 1 Japanese Patent Application Publication No. 2009-192385

SUMMARY OF THE INVENTION

Problem to be Solved by the Invention

One aspect of the present invention provides a displacement sensor and a distance adjustment apparatus that can reduce the strength of the oscillation signal with low cost and also a simple constitution.

Means for Solving the Problem

One aspect of the present invention is a displacement sensor includes a coil, an inverter electrically connected to the coil, the inverter being configured to generate an oscillation signal, a reducer electrically connected between the coil and an output terminal of the inverter, the reducer being configured to reduce the strength of the oscillation signal, and a frequency detector electrically connected to the inverter, the frequency detector being configured to detect an oscillation frequency of an oscillator circuit in response to a distance between a measurement target and the coil, the oscillator circuit including the coil, the inverter, and the reducer and having an oscillation frequency of 30 MHz or higher.

In one aspect of the present invention, the reducer may include a noise reducer configured to reduce the strength of the oscillation signal above a prescribed frequency.

In one aspect of the present invention, the noise reducer may include a magnetic material.

In one aspect of the present invention, the magnetic material may include ferrite.

In one aspect of the present invention, the reducer may include a resistance configured to reduce the strength of a fundamental waveform and a harmonic included in the oscillation signal.

In one aspect of the present invention, the frequency detector may include a frequency counter configured to count the number of times that a signal value of the oscillation signal that varies its frequency in response to the distance between the measurement target and the coil has exceeded a threshold and derive the oscillation frequency of the oscillator circuit based on the counted number of times.

One aspect of the present invention may further include an output configured to output to the outside as a digital signal a value indicating the distance between the measurement target and the coil based on the oscillation frequency detected by the frequency detector.

In one aspect of the present invention, the inverter and the frequency detector may be constituted by one hardware, the coil and the reducer may be disposed outside the hardware, and the reducer may be connected to an output terminal of hardware.

In one aspect of the present invention, the reducer may disposed closer to the hardware than the coil.

One aspect of the present invention may further include a noise shield configured to cover at least an interconnection connecting the hardware to the reducer.

One aspect of the present invention may further include a board, on which the coil, the hardware, and the reducer are disposed. The hardware and the reducer may be disposed on a first surface of the board and the coil may be disposed on a second surface of the board opposite to the first surface of the board.

In one aspect of the present invention, the reducer may include a noise reducer configured to reduce the strength of a harmonic included in the oscillation signal, and a resistance configured to reduce the strength of a fundamental waveform and a harmonic included in the oscillation signal. The resistance and the noise reducer may be disposed sequentially from the side closer to the output terminal of the hardware between the output terminal of the hardware and the coil.

Another aspect of the present invention is a distance adjustment apparatus including the displacement sensor, a distance adjuster configured to adjust the distance between the measurement target and the displacement sensor, and a controller configured to control the distance adjuster to set the distance between the measurement target and the displacement sensor to a desired distance based on a value input from the displacement sensor.

Effect of the Invention

According to one aspect of the present invention, a displacement sensor and a distance adjustment apparatus are provided that can reduce the strength of the oscillation signal with a low cost and a simple constitution.

BRIEF DESCRIPTIONS OF THE DRAWINGS

DESCRIPTION OF EMBODIMENTS

A number of embodiments of the present invention will be described below, with references made to the drawings.

First Embodiment

Figure 1:
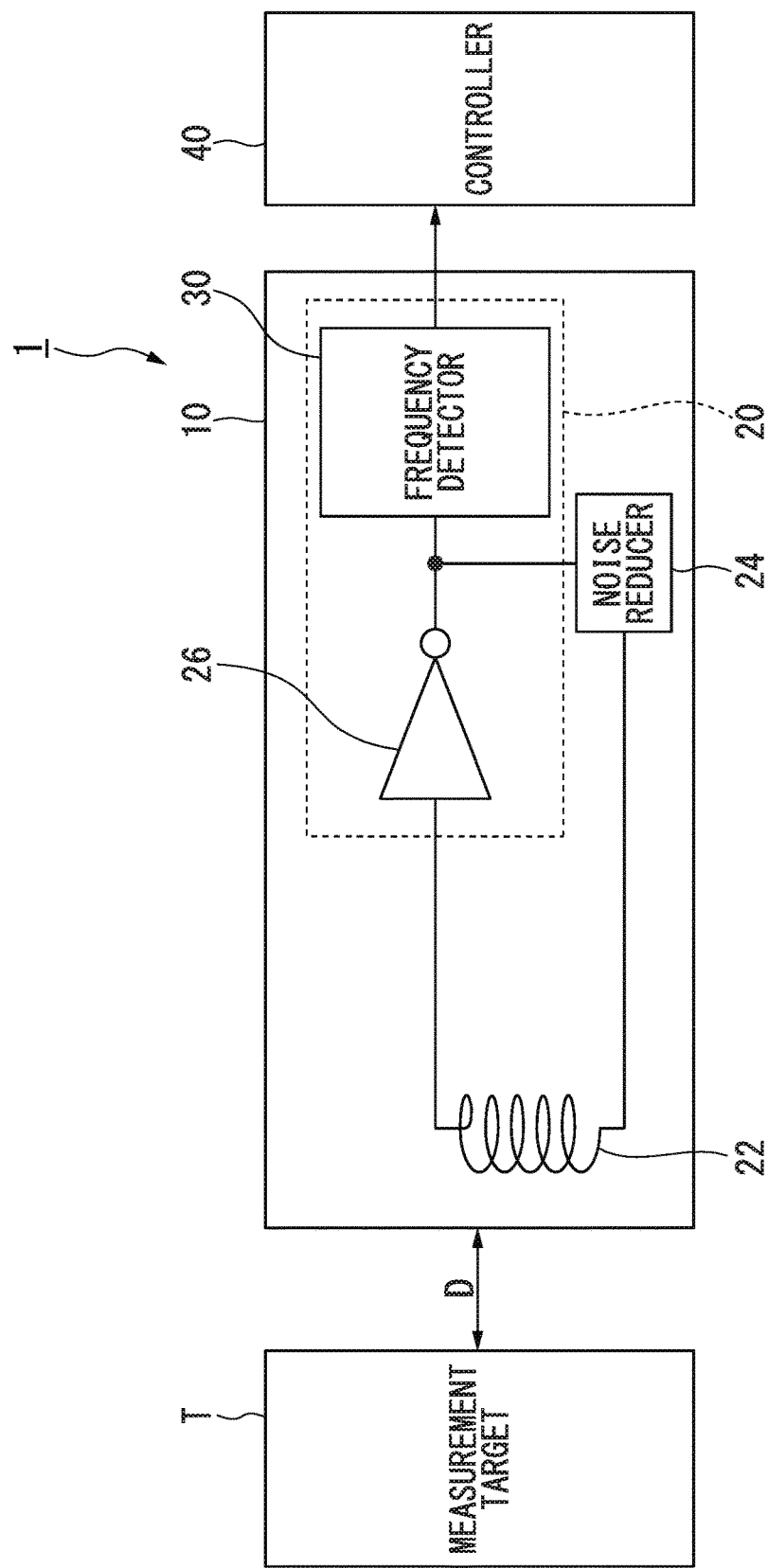
FIG. 1 is a block diagram showing an example of the constitution of a displacement sensor of the first embodiment of the present invention.

FIG. 1 is a block diagram showing an example of the constitution of a displacement sensor 1 of the first embodiment. The displacement sensor 1 includes, for example, a board 10, a coil 22, a noise reducer 24 (reducer), an inverter 26, and a frequency detector 30. The displacement sensor 1 measures the distance D between a measurement target T, which is an electrical conductor such as a metal, and the displacement sensor 1, and outputs the measurement result to an external controller 40 or the like. The coil 22, the noise reducer 24, and the inverter 26 form a loop circuit and function as an oscillator circuit.

The board 10 is formed, for example, of a glass board, an epoxy-based board (glass epoxy board, paper epoxy board, or the like), a polyimide board, or a ceramic board. The board 10 in the block diagram of FIG. 1 may have an arbitrary shape, such as rectangular, circular, or square.

The coil 22 is provided on a surface of the displacement sensor 1, and is used with a disposition in which the center axis thereof points toward the measurement target T. The displacement sensor 1 measures the distance between the coil 22 and the measurement target T. The oscillation frequency of the oscillator circuit is 30 MHz or higher. The oscillation frequency of the oscillator circuit is, for example, approximately from 100 to 500 MHz.

Figure 2:
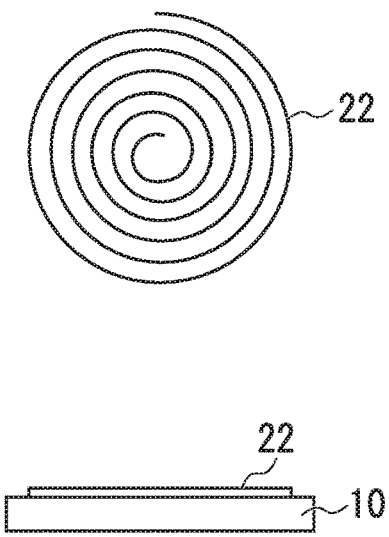
FIG. 2 shows the positional relationship between a coil and a board of the first embodiment of the present invention.

FIG. 2 shows the positional relationship between the coil 22 and the board 10 in the first embodiment. The coil 22 is disposed on the board 10. The material of the coil is, for example, Ag, Cu, gold, or the like. The surface of the coil 22 is covered with a protective film to prevent soiling and oxidation from the outside. Although FIG. 2 shows a flat, round spiral coil as the coil 22, the coil 22 may be a square spiral coil. In order to reduce the size and achieve a number of turns of the coil, the coil may be made into a multilayer spiral coil.

The noise reducer 24 reduces the strength of a harmonics output from the coil 22. One end of the noise reducer 24 is connected to the coil 22, and the other end is electrically connected between the output terminal of the inverter 26 and a frequency detector 30. The noise reducer 24 reduces the strength of the signal above a prescribed frequency. The noise reducer 24 includes, for example, a magnetic material. Examples of the magnetic material are ferrite, iron, cobalt, nickel, or an alloy of these materials. If ferrite is used, for example, the frequency of the noise that can be reduced will differ, depending on the type of ferrite. For that reason, ferrite is selected in accordance with the noise. As one example, the ferrite reduces the strength of harmonics having a frequency from two times to four times the oscillation frequency used to calculate the distance D between the measurement target T and the coil 22 (100 to 500 MHz, for example, 200 MHz).

The inverter 26 generates an oscillation signal to cause the coil 22 oscillate at a high frequency. The inverter 26, for example, is a CMOS inverter. The input terminal of the inverter 26 is electrically connected to the coil 22. The inverter 26 operates to output a high signal if a low signal is input, and output a low signal if a high signal is input thereto, thereby causing the coil 22 to oscillate.

The frequency detector 30 detects the oscillation frequency of the oscillator circuit, which varies with the distance between the measurement target T and the coil 22. The frequency detector 30 outputs to the controller 40, which is an external device, a value (count value) indicating the detected oscillation frequency. The frequency detector 30 may output to the controller 40 a value indicating the detected frequency converted to the distance D between the measurement target T and the coil 22. The controller 40 may be incorporated within the displacement sensor 1.

The inverter 26 and the frequency detector 30 may be mounted onto the board 10 as hardware, such as an IC (integrated circuit) 20 or the like. In this case, the coil 22 and the noise reducer 24 are disposed outside the IC 20. The noise reducer 24 is disposed at the output terminal of the IC 20, so that noise is not superimposed on the coil 22. The noise reducer 24 is disposed close to the IC 20, and preferably the length of the interconnection between the noise reducer 24 and the IC 20 is made as short as possible. For example, the noise reducer 24 may be disposed closer to the IC 20 than the coil 22.

The controller 40 converts the value indicating the oscillation frequency input from the frequency detector 30 to the distance D between the measurement target T and the coil 22 and displays this distance. The controller 40 is, for example, a terminal device such as a personal computer or a mobile telephone. In a case, for example, in which the frequency detector 30 outputs to the controller 40 a value converted to the distance D between the measurement target T and the coil 22, the controller 40 may be a liquid crystal display or an organic EL (electroluminescence) display device or the like.

Figure 3:
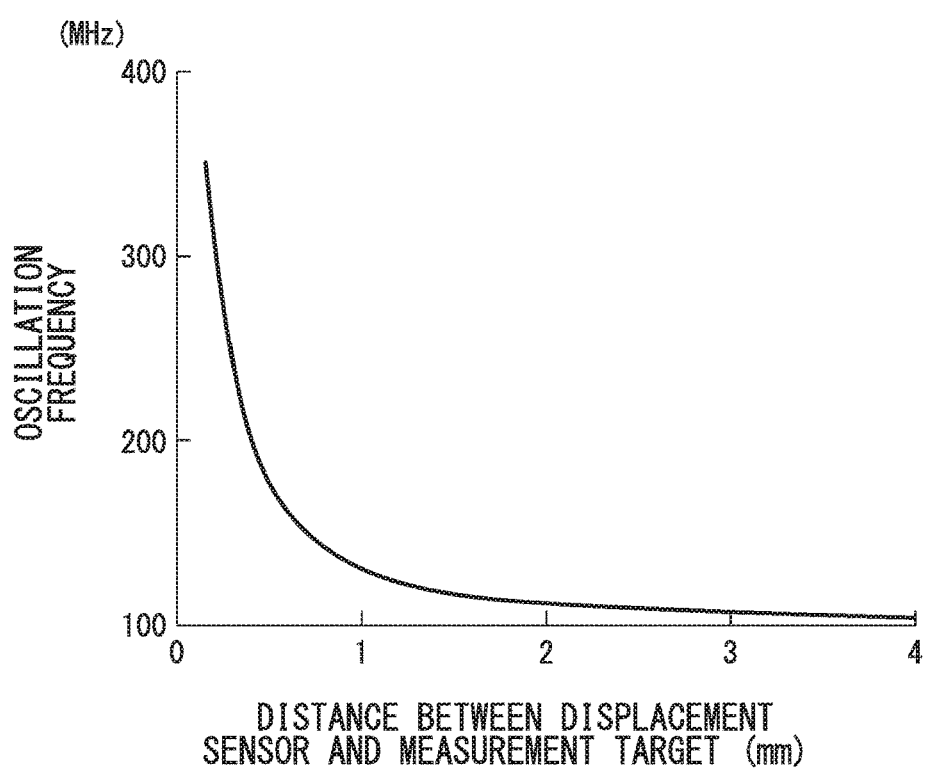
FIG. 3 is a graph showing an example of the relationship between the oscillation frequency of the oscillator circuit and the distance between the displacement sensor and the measurement target in the first embodiment of the present invention.

FIG. 3 is a graph showing an example of the relationship between the oscillation frequency of the oscillator circuit and the distance between the displacement sensor 1 and the measurement target T in the first embodiment. As shown in the FIG. 3, as the distance between the displacement sensor 1 and the measurement target T increases, the oscillation frequency of the oscillator circuit decreases, and as the distance between the displacement sensor 1 and the measurement target T decreases, the oscillation frequency of the oscillator increases. Based on this relationship, the controller 40 calculates a value that is converted to the distance D between the measurement target T and the coil 22 from the oscillation frequency input from the frequency detector 30.

Figure 4:
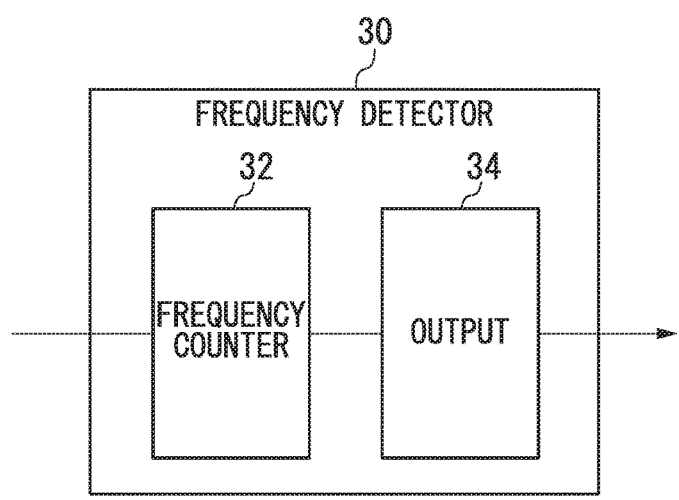
FIG. 4 is a block diagram showing an example of the constitution of a frequency detector of the first embodiment of the present invention.

FIG. 4 is a block diagram showing an example of the constitution of the frequency detector 30 of the first embodiment. The frequency detector 30 includes, for example, a frequency counter 32 and an output 34. The frequency counter 32 detects the oscillation frequency of the oscillator circuit responsive to the distance between the measurement target T and the coil 22. Specifically, the counter 32 counts the number of times the signal value (voltage) of the oscillation signal that varies in response to the distance D between the measurement target T and the coil 22 exceeds a threshold and, based on the counted number of times, derives the oscillation frequency of the oscillator circuit. The measurement time of the frequency counter 32 counting the frequency can be set beforehand, according to the application. The resolution of the displacement sensor 1 can be increased by setting the measurement time to be long. The measurement time is, for example, 100 μs, 200 μs, 300 μs, or 400 μs.

The output 34 outputs to the controller 40 as a digital signal a value indicating the oscillation frequency detected by the frequency counter 32.

The operation of the displacement sensor 1 of the first embodiment will now be described. When the coil 22 included in the oscillator circuit is caused to oscillate at a high frequency, the magnetic field radiated from the coil 22 causes a current to be induced in the surface of the measurement target T by electromagnetic induction. In this case, if the measurement target T moves so as to either approach or move away from the coil 22, the oscillation frequency changes.

Figure 5A:
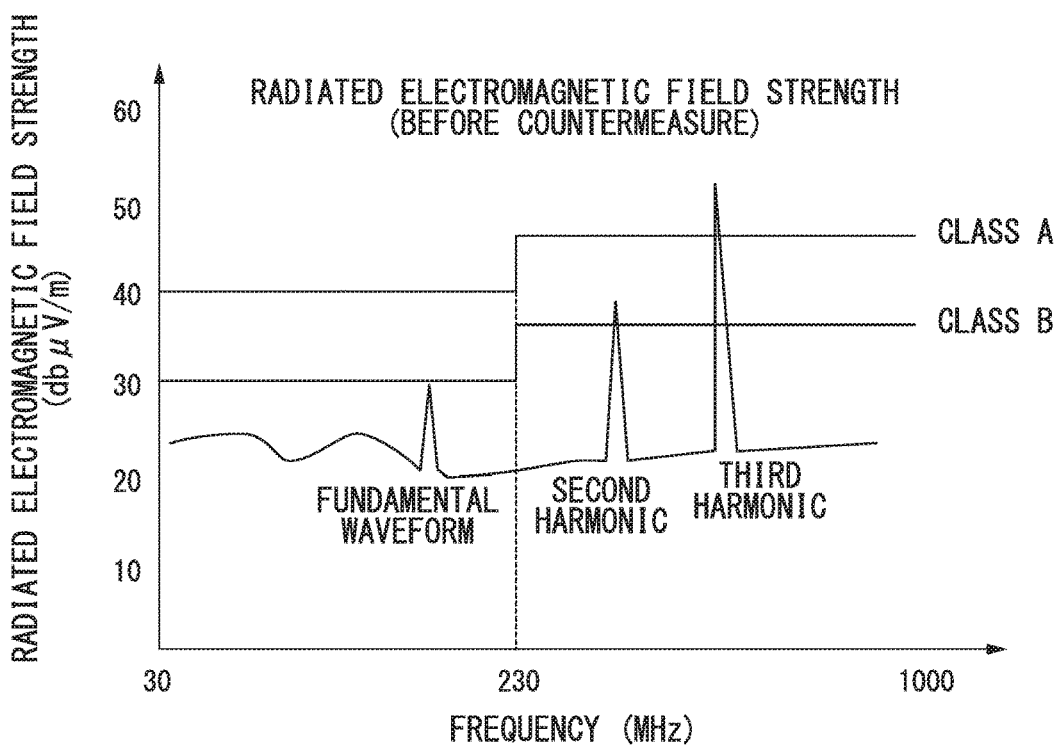
FIG. 5A is a graph of the radiated electromagnetic field strength generated by the oscillator circuit of the first embodiment of the present invention.

However, harmonics, which are noise components, are included in the signal indicating the oscillation frequency of the oscillator circuit. For example, as shown in FIG. 5A, the signal indicating the oscillation frequency of the oscillator circuit, in addition to the fundamental waveform used for calculating the distance D between the measurement target T and the coil 22, includes a second harmonic and a third harmonic, which have higher frequencies. EMC standards establish limit values of the strengths of electromagnetic radiation from devices such as this. These limit values are established for each individual device (class) and vary depending upon the frequency. The units for these values are, for example, dbμV/m. For example, devices used in an industrial environment are classified as Class A, and devices used in a general home environment are classified as Class B. The limit value for Class A is higher than the limit value for Class B. FIG. 5A shows an example in which the second-harmonic strength exceeds the Class B limit value, and the third-harmonic strength exceeds the Class A limit value. For example, if the displacement sensor 1 is intended for use in an industrial environment, the strengths of the second and third harmonics radiated outside of the displacement sensor 1 need to be suppressed to at least values below the limit values for Class A.

Figure 5B:
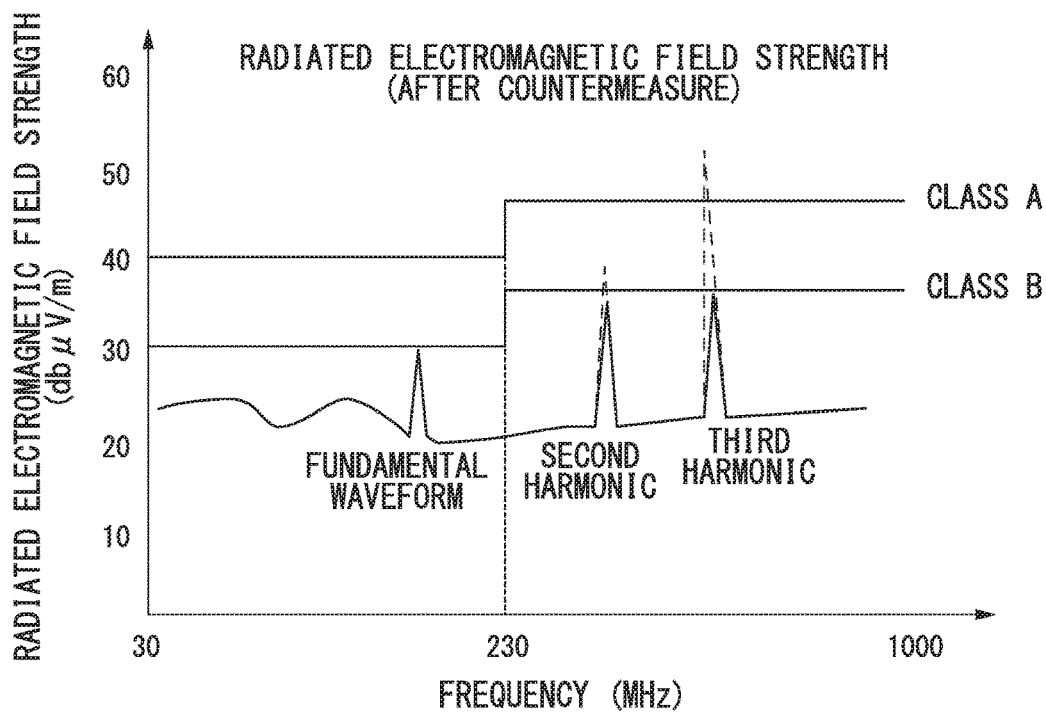
FIG. 5B is a graph of the radiated electromagnetic field strength after the oscillation signal generated by the oscillator circuit is processed by a noise reducer in the first embodiment of the present invention.

Given this, in the first embodiment the noise reducer 24 is provided that reduces the strength of harmonics generated by the oscillator circuit. In a signal that includes harmonics, by passing through the noise reducer 24, the strengths of the harmonics are reduced. FIG. 5B shows the radiated electromagnetic field strength after passing through the noise reducer 24 (radiated electromagnetic field strength after applying the countermeasure). In FIG. 5B, it can be seen that the strength of the fundamental waveform used for calculating the distance D between the measurement target T and the coil 22 is not changed, and strengths of the second harmonic and third harmonic are reduced to below the limit values in Class B. This enables prevention of radiation of harmonics to outside the displacement sensor 1 exceeding a reference value (class B).

The frequency counter 32 of the frequency detector 30 detects the oscillation frequency of the signal and inputs to the output 34 a value indicating the detected oscillation frequency. Next, the output 34 outputs to the controller 40 as a digital signal a value indicating the oscillation frequency input from the frequency counter 32.

The controller 40 converts the oscillation frequency input from the output 34 to the distance D between the measurement target T and the coil 22. This enables a user of the displacement sensor 1 to measure the distance to the measurement target T.

Figure 6:
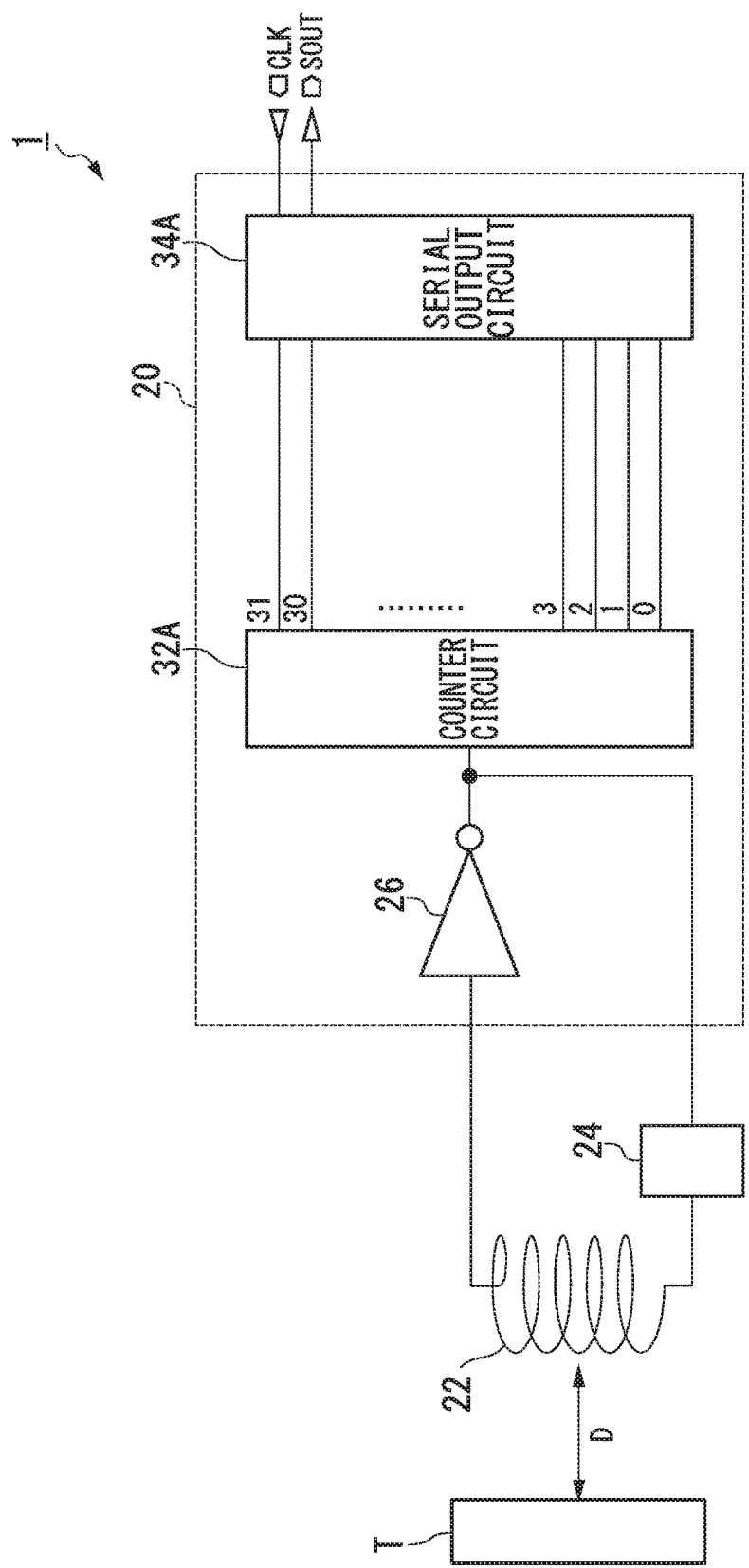
FIG. 6 shows an example of the circuit constitution of a displacement sensor of the first embodiment of the present invention.

FIG. 6 shows an example of the circuit constitution of the displacement sensor 1 of the first embodiment. The circuit diagram shown in FIG. 6 shows a counter circuit 32A of the frequency counter 32 and a serial output circuit 34A of the output 34.

The counter circuit 32A has, for example, 32 bits of output from 0 to 31, each of which is connected to the serial output circuit 34A. The serial output circuit 34A outputs via a serial output terminal SOUT, based on a clock input from an external clock terminal CLK, a serial signal output from the counter circuit 32A, based on the oscillation frequency of the coil 22.

According to the displacement sensor 1 of the first embodiment described above, the noise reducer 24 that reduces the strength of harmonics generated by the oscillator circuit is provided. This enables provision of a displacement sensor that can reduce the strengths of harmonics radiated to outside, with a low cost and a simple constitution.

Second Embodiment

Figure 7:
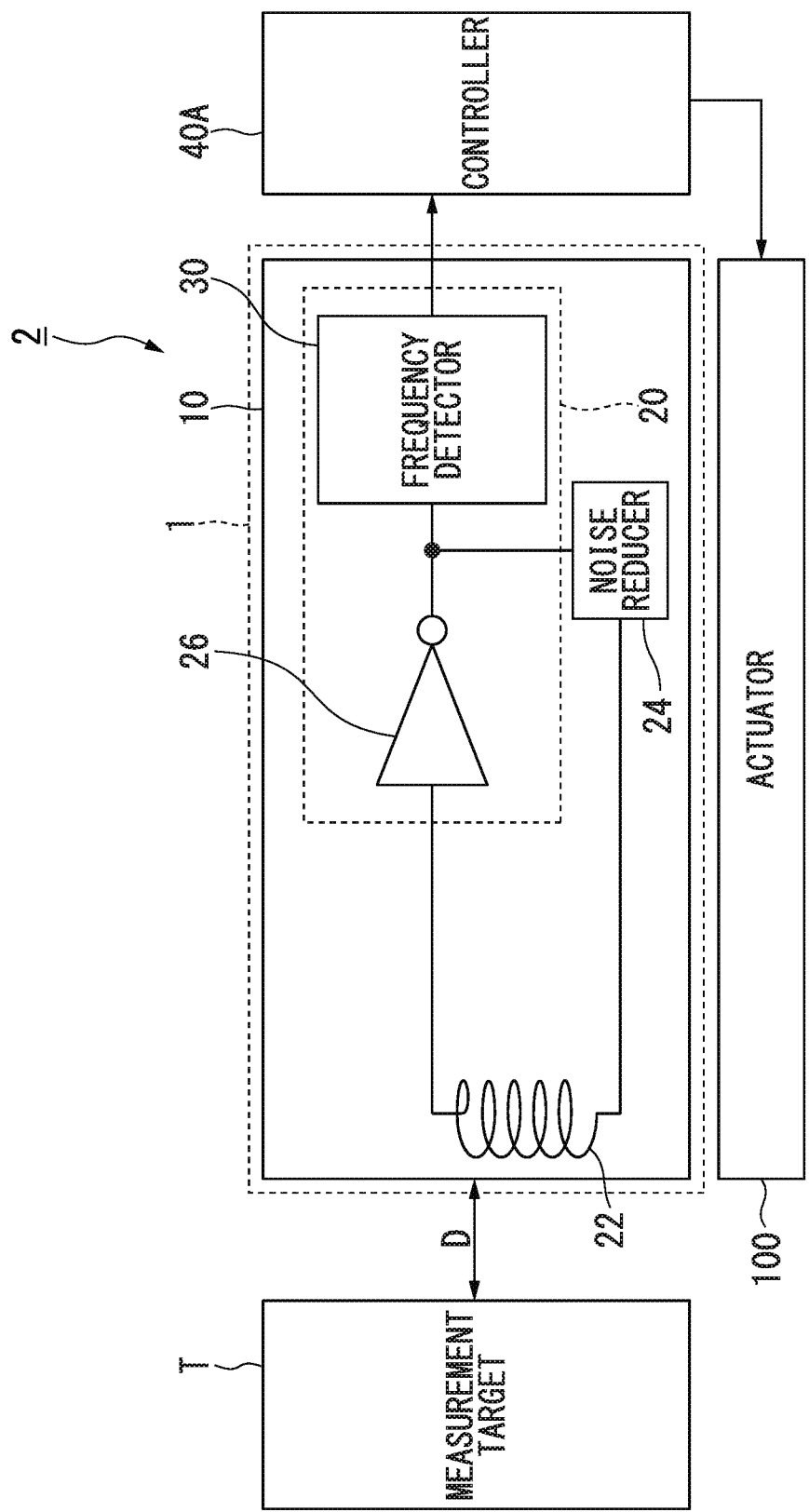
FIG. 7 is a block diagram showing an example of the constitution of a distance adjustment apparatus of a second embodiment of the present invention.

A distance adjustment apparatus 2 of the second embodiment will now be described. The distance adjustment apparatus 2 shown in FIG. 7 includes, for example, the displacement sensor 1 of the first embodiment, a controller 40A, and an actuator (distance adjuster) 100. For that reason, the drawings and language describing the first embodiment regarding the displacement sensor 1 will be incorporated here by reference, the same reference symbols being applied, and the descriptions thereof being omitted.

The controller 40A, based on a value input from the displacement sensor 1, controls the actuator 100 so that the distance between the measurement target and the displacement sensor is the desired distance. The controller 40A converts a value indicating the oscillation frequency input from the displacement sensor 1 to the distance D between the measurement target T and the coil 22 and displays the distance. Additionally, the controller 40A, based on the converted distance D, outputs a distance adjustment signal to the actuator 100, for example, to enable feedback control regarding the position of the displacement sensor 1. For example, if the distance between the displacement sensor 1 (the apparatus including the displacement sensor) and the measurement target T is smaller than a prescribed threshold, the distance adjustment signal is output to the actuator 100 to increase the distance between the displacement sensor 1 and the measurement target T and set it to a prescribed distance. If the distance between the displacement sensor 1 and the measurement target T is larger than a prescribed threshold, the distance adjustment signal is output to the actuator 100 to reduce the distance between the displacement sensor 1 and the measurement target T and set it to a prescribed distance. Also, if the distance between the displacement sensor 1 and the measurement target T is within a prescribed range, a distance adjustment signal is output to the actuator 100 to maintain the distance between the displacement sensor 1 and the measurement target T.

The actuator 100 adjusts the distance between the measurement target T and the displacement sensor 1. The actuator 100 includes, for example, a driver such as a motor. Based on the distance adjustment signal input from the controller 40A, the actuator 100, for example, adjusts the position of the displacement sensor 1. If the actuator 100 receives from the controller 40A a distance adjustment signal that increases the distance between the displacement sensor 1 and the measurement target T to set it to a prescribed distance, the actuator 100 moves the position of the displacement sensor 1 away from the measurement target T, so that the distance between the two is the prescribed distance. If the actuator 100 receives from the controller 40A a distance adjustment signal that decreases the distance between the displacement sensor 1 and the measurement target T to set it to a prescribed distance, the actuator 100 moves the position of the displacement sensor 1 toward the measurement target T, so that the distance between the two is the prescribed distance. If the actuator 100 receives from the controller 40A a distance adjustment signal to maintain the distance between the displacement sensor 1 and the measurement target T, the actuator 100 does not move the displacement sensor 1 and maintains its current position.

According to the distance adjustment apparatus 2 of the second embodiment described above, the controller 40A converts to the distance D from the oscillation frequency input from the frequency detector 30, and outputs to the actuator 100 a distance adjustment signal based on this distance D. This enables feedback control regarding the position of the displacement sensor 1. Although in the second embodiment, the example shown has been one in which the actuator 100 adjusts the position of the displacement sensor 1, the actuator 100 may be made to adjust the position of the measurement target T.

Third Embodiment

The displacement sensor 3 of the third embodiment will now be described. Compared with the displacement sensor 1 of the first embodiment, the displacement sensor 3 of the third embodiment differs by having a resistance 50. For that reason, in the description of the third embodiment, parts that are the same as in the above-noted first embodiment are assigned the same reference symbols, and the descriptions thereof will be omitted or simplified.

Figure 8:
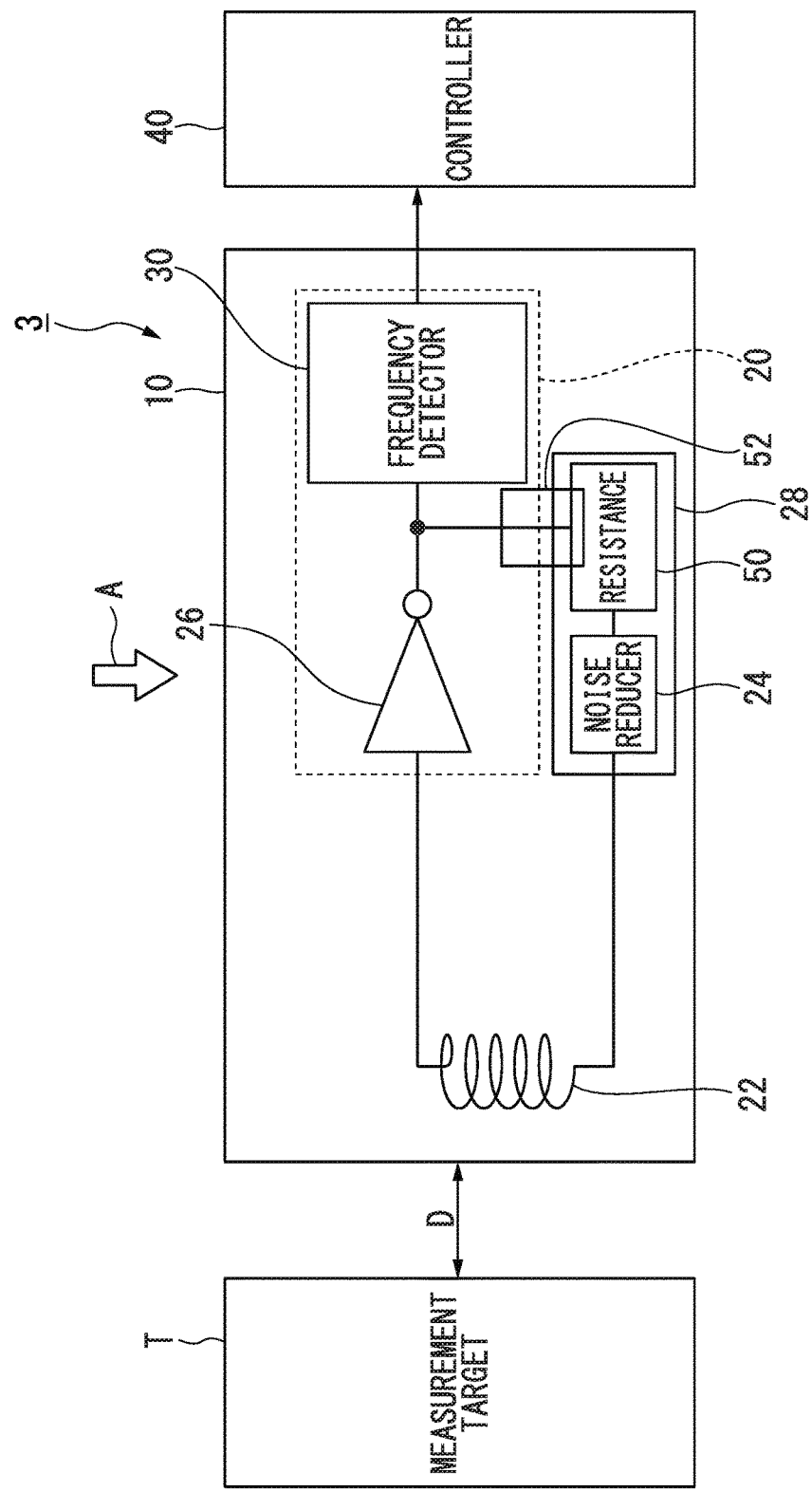
FIG. 8 is a block diagram showing an example of the constitution of a displacement sensor of a third embodiment of the present invention.

FIG. 8 is a block diagram showing an example of the constitution of the displacement sensor 3 of the third embodiment. The displacement sensor 3 includes, for example, the board 10, the coil 22, the inverter 26, and the frequency detector 30 of the displacement sensor 1 of the first embodiment. The displacement sensor 3 further includes a reducer 28. The reducer 28 includes, for example, a noise reducer 24 and a resistance 50. The coil 22, the noise reducer 24, the resistance 50, and the inverter 26 form a loop circuit and function as an oscillator circuit.

The resistance 50, by reducing the siemens (ease of current flow) in the oscillator circuit, reduces the strength of the oscillation signal (electromagnetic signal) passing through the resistance 50. The resistance 50 reduces the strength of the fundamental waveform and the harmonics such as second harmonic and third harmonic included in the signal indicating the oscillation frequency of the oscillator circuit. For example, if the strength of the fundamental waveform exceeds the limit value of an EMC standard, by providing the resistance 50, the strength of the fundamental waveform can be reduced to no greater than the limit value. The resistance 50 includes, for example, an electrically resistive element having a prescribed resistance value. Alternatively, even if the strength of the fundamental waveform is within the EMC standard limit value, if the harmonic strength is excessively high, by providing the resistance 50 the harmonic strength can be reduced. This enables the strength of the oscillation signal input to the downstream noise reducer 24 to be made an appropriate value. The resistance 50 may be provided for that purpose.

One end of the resistance 50 is connected to the noise reducer 24, and the other end is electrically connected between the output of the inverter 26 and the frequency detector 30. If the inverter 26 and the frequency detector 30 are mounted as hardware, such as an IC 20, on the board 10, the resistance 50 (reducer 28) is disposed outside the IC 20, and the other end of the resistance 50 is connected to the output terminal of the IC 20. Stated differently, between the output terminal of the IC 20 and the coil 22, the resistance 50 and the noise reducer 24 are disposed, sequentially from the side closer to the output terminal of the IC 20. If the resistance 50 and the noise reducer 24 are disposed in this manner, first the resistance 50 reduces the strength of both the fundamental waveform and the harmonics included in the oscillation signal output from the output terminal of the IC 20. Then, the noise reducer 24 reduces the strength of the harmonics included in the oscillation signal output from the resistance 50. This enables effective reduction of the high-strength oscillation signal leaking to the outside. Harmonic reduction processing by the noise reducer 24 can also be performed effectively.

In this case, the reducer 28 that includes the resistance 50 is disposed close to the IC 20, and preferably the length of the interconnection between the reducer 28 and the IC 20 is made as short as possible. For example, the reducer 28 may be disposed closer to the IC 20 than the coil 22. This enables effective reduction of a high-strength oscillation signal leaking to the outside.

Adjustment of the electromagnetic field strength is done by adjusting the ratio between the siemens of the inverter 26 and the resistance value of the resistance 50. If the resistance value of the resistance 50 is increased, the electromagnetic field strength decreases, and if the resistance value of the resistance 50 is decreased, the electromagnetic field strength increases. If the inverter 26 and the frequency detector 30 are constituted as the IC 20 and if the strength of the electromagnetic signal output from the IC 20 is to be adjusted, the resistance value of the resistance 50 is established by the following Equation (1).

[Equation 1]

$$\frac{G1}{R1} = \frac{G2}{R2+R3} \quad \text{(Equation 1)}$$

In the above Equation 1, G1 is the siemens of a reference IC that satisfies the EMC standard, R1 is the internal resistance value of the reference IC, G2 is the siemens of the IC 20 to be adjusted, R2 is the internal resistance value of the IC 20, and R3 is the resistance value of the resistance 50. In this case, the internal resistance of an IC represents the resistance value from the output terminal of the inverter 26 up to the output terminal of the IC 20. The resistance value of the resistance 50 is determined by determining the R3 that satisfies Equation (1). To satisfy the oscillation conditions of the oscillator circuit, the value of R3 is controlled so that the Q value represented by Equation (2) below is not excessively small.

[Equation 2]

$$Q = \frac{\omega L}{R2+R3} \quad \text{(Equation 2)}$$

In the above Equation (2), L is the inductance of the coil 22, and ω is the angular frequency.

Figure 9A:
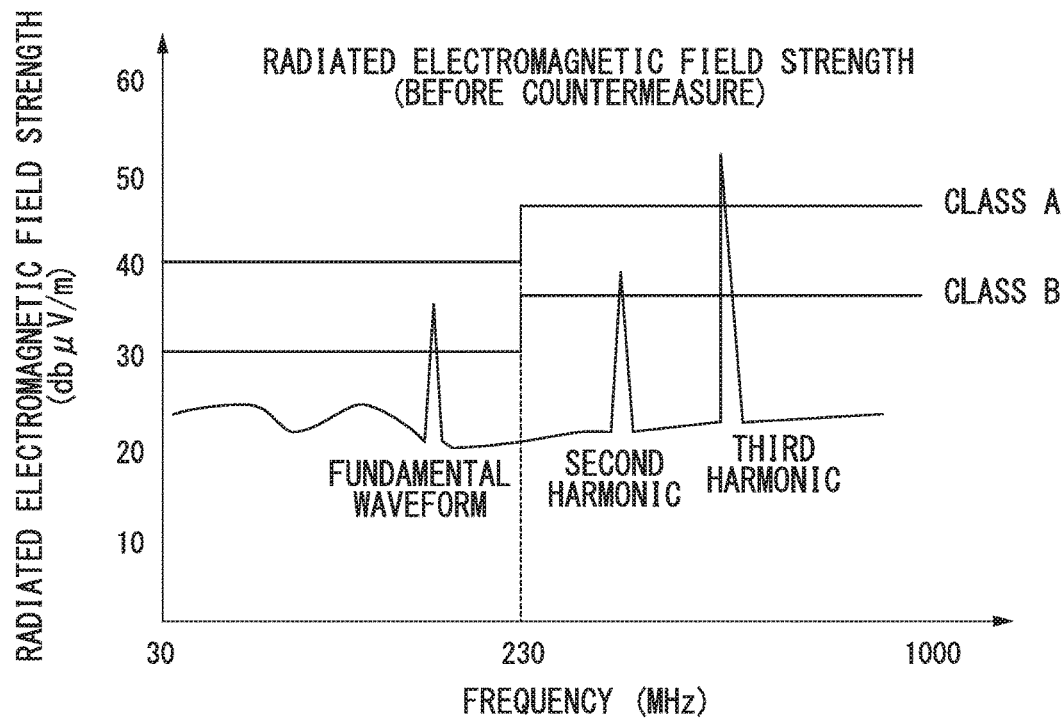
FIG. 9A is a graph showing an example of the radiated electromagnetic field strength generated by the oscillator circuit of the third embodiment of the present invention.

FIG. 9A is a graph showing an example of the radiated electromagnetic field strength generated by the oscillator circuit of the third embodiment. FIG. 9A shows an example in which the fundamental waveform used for calculating the distance D between the measurement target T and the coil 22 exceeds the Class B limit value, the strength of the second harmonic exceeds the Class B limit value, and the strength of the third harmonic exceeds the Class A limit value.

Figure 9B:
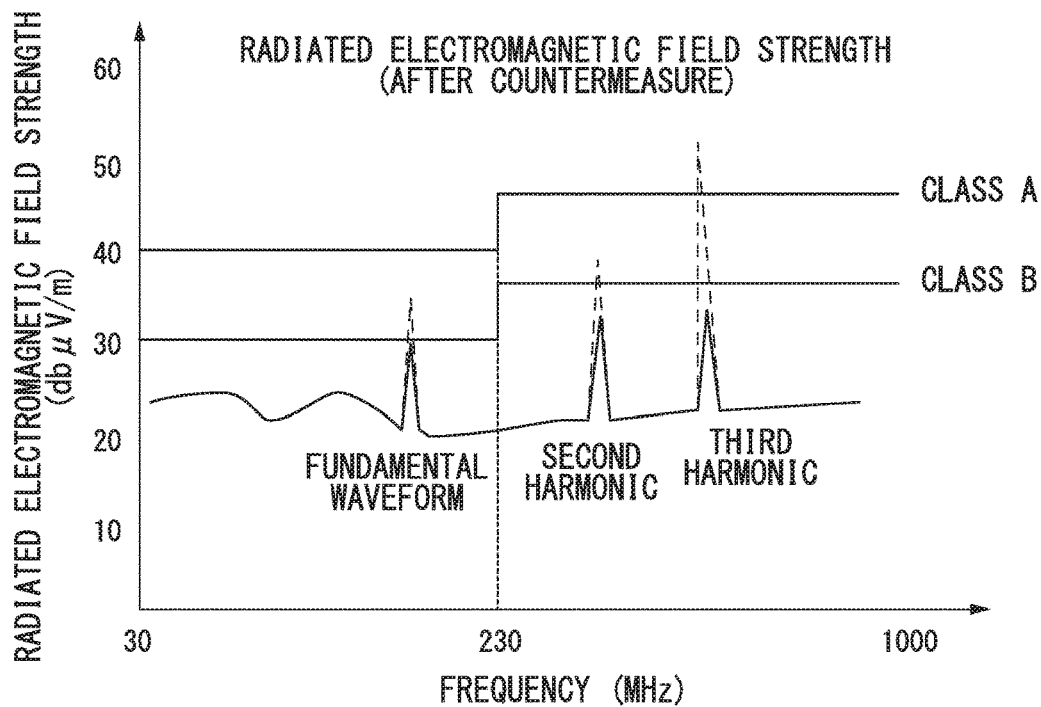
FIG. 9B is a graph of the radiated electromagnetic field strength after the oscillation signal generated by the oscillator circuit is processed by a resistance and a noise reducer in the third embodiment of the present invention.

FIG. 9B shows the radiated electromagnetic field strength after passing through the resistance 50 and the noise reducer 24 (radiated electromagnetic field strength after applying the countermeasure). In FIG. 9B, it can be seen that the strength of the fundamental waveform is reduced to the point at which it is below the Class B limit value. It can also be seen that, compared with the constitution of the first embodiment, in which the noise reducer 24 is provided, with the constitution of the third embodiment, in which the resistance 50 and the noise reducer 24 are provided, the strengths of the second harmonic and the third harmonic are further reduced. This enables prevention of radiation of electromagnetic signals that exceed a reference value (Class B) to the outside of the displacement sensor 1.

In the oscillator circuit of the third embodiment, between the output terminal of the IC 20 and the coil 22, from the side close to the output terminal of the IC 20, the resistance 50 and the noise reducer 24 are sequentially disposed. If the fundamental waveform included in the oscillation signal output from the output terminal of the IC 20 is large, it is preferable that the resistance 50 first drops the overall oscillation signal to an appropriate level, and then the noise reducer 24 reduces the strength of the harmonics.

Figure 10A:
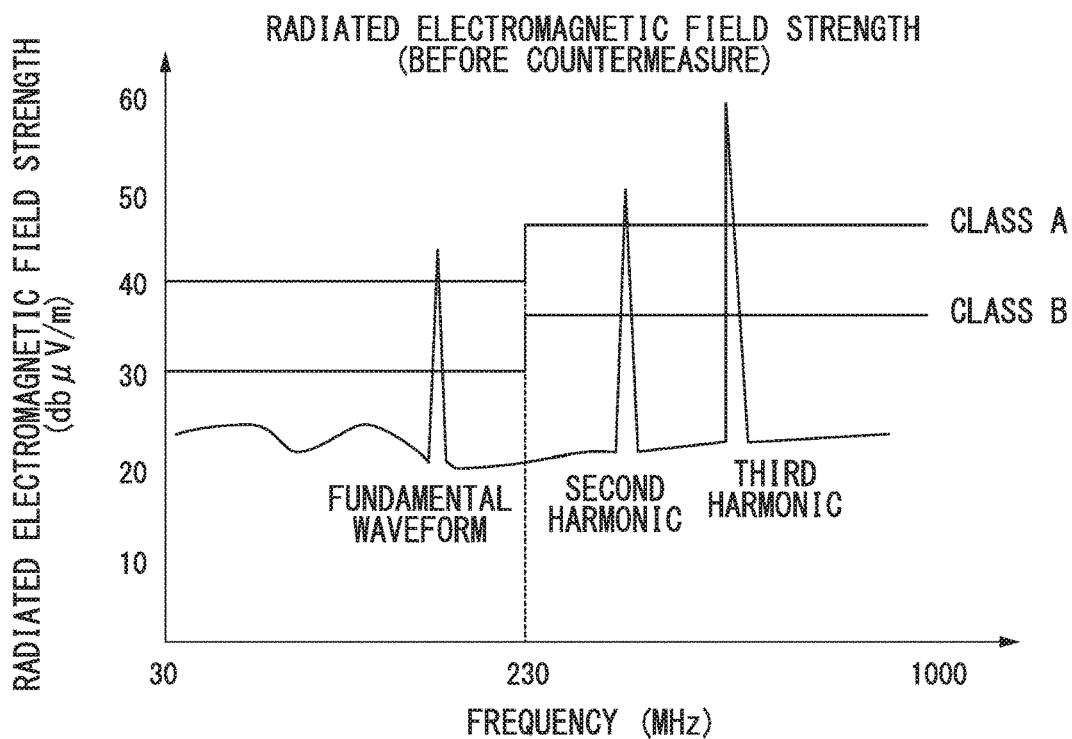
FIG. 10A is a graph showing another example of the radiated electromagnetic field strength generated by the oscillator circuit in the third embodiment of the present invention.

FIG. 10A is a graph of another example of the radiated electromagnetic field strength generated by the oscillator circuit of the third embodiment. FIG. 10A shows an example in which the strengths of the fundamental waveform, the second harmonic, and the third harmonic exceed the limit values for Class A.

Figure 10B:
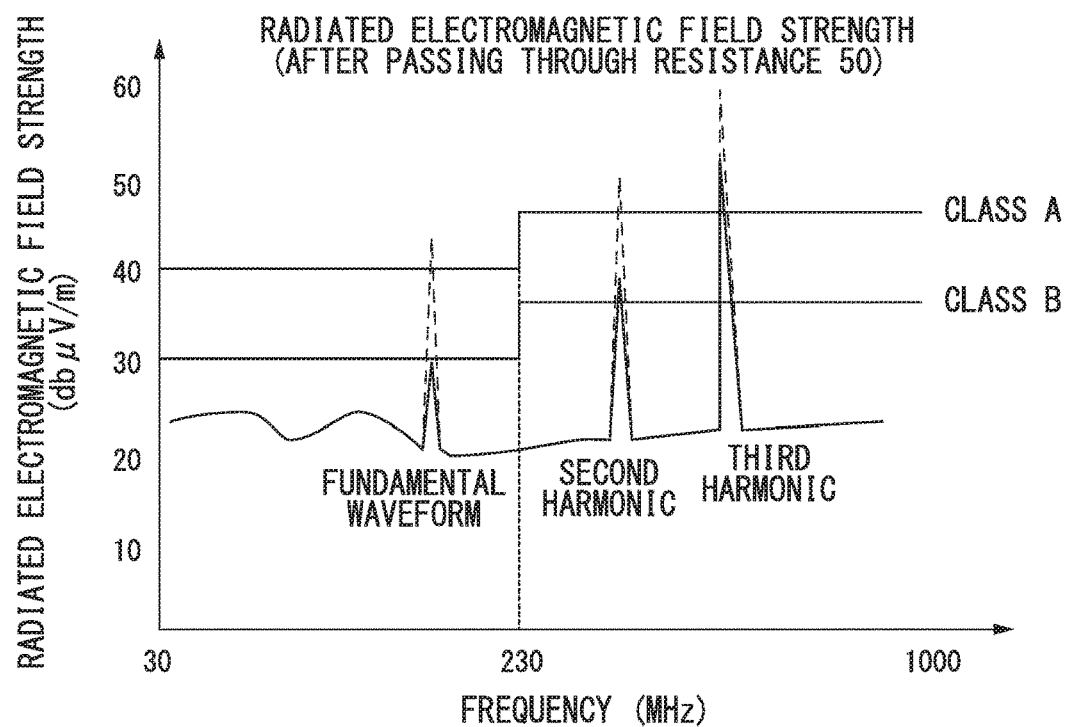
FIG. 10B is a graph showing the radiated electromagnetic field strength after passing through the resistance in the third embodiment of the present invention.

FIG. 10B is a graph showing the radiated electromagnetic field strength after passing through the resistance 50 (before passing through the noise reducer 24). In FIG. 10B, it can be seen that the strength of the fundamental waveform is reduced to the point at which it does not exceed the Class B limit value. It can also be seen that the strengths of the second harmonic and the third harmonic are also reduced. This enables the overall oscillation signal to be dropped to an appropriate level.

Figure 10C:
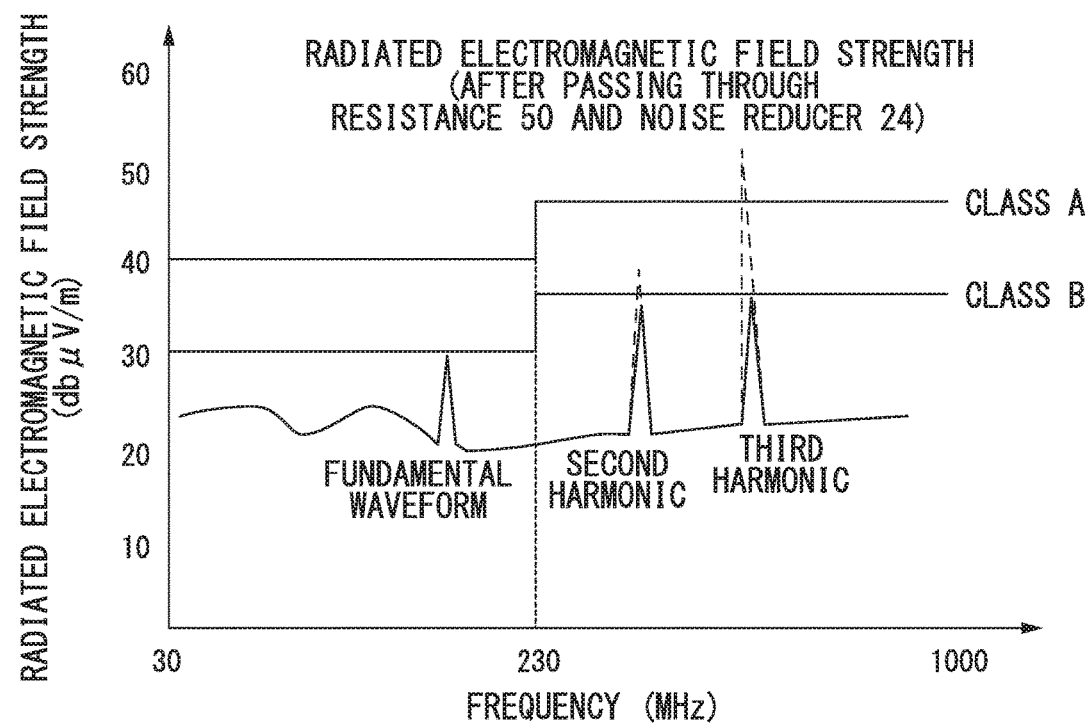
FIG. 10C is a graph showing the radiated electromagnetic field strength after passing through the noise reducer in the third embodiment of the present invention.

FIG. 10C is a graph showing the radiated electromagnetic field strength after passing through the resistance 50 and the noise reducer 24. In FIG. 10C, it can be seen that there is no change in the strength of the fundamental waveform, and that the strengths of the second harmonic and the third harmonic are reduced to the point at which they do not exceed the Class B limit values. This enables prevention of radiation to the outside of the displacement sensor 1 of an electromagnetic signal exceeding the reference value (Class B).

Between the output terminal of the IC 20 and the reducer 28 may be covered by a noise shield 52 to suppress the leakage of electromagnetic signals output from the interconnection between the output terminal of the IC 20 and the reducer 28. The noise shield 52, for example, may be an electromagnetic sheet or gel having an electromagnetic shielding effect. The noise shield 52 may cover the overall IC 20 and reducer 28.

Figure 11:
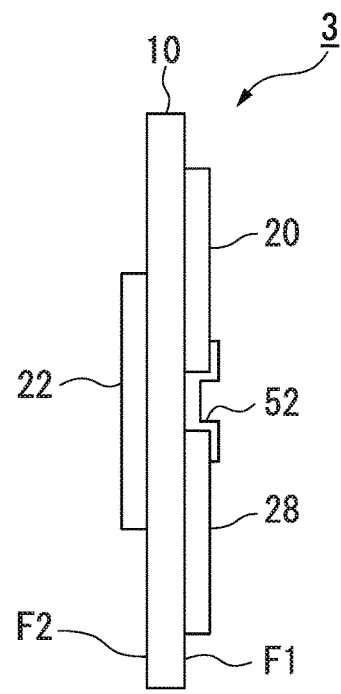
FIG. 11 shows an example of the positional relationship between the IC and resistance and the coil in the third embodiment of the present invention.

All of the IC 20, the reducer 28, and the coil 22 may be disposed on one surface (single side) of the board 10, or may be disposed divided between a first surface of the board 10 and a second surface opposite to the first surface. FIG. 11 shows an example of the positional relationship between the coil 22, and the IC 20 and the reducer 28 as a side view of the board 10, seen from the direction A shown in FIG. 8. As shown in FIG. 11, the IC 20 and the reducer 28 may be disposed on the first surface F1 of the board 10 and the coil 22 disposed on the second surface F2 opposite to the first surface F1. In this case, by connecting the IC 20 and reducer 28, and the coil 22 using interconnects that pass through the board 10 in the thickness direction, the length of interconnections can be shortened.

Figure 12:
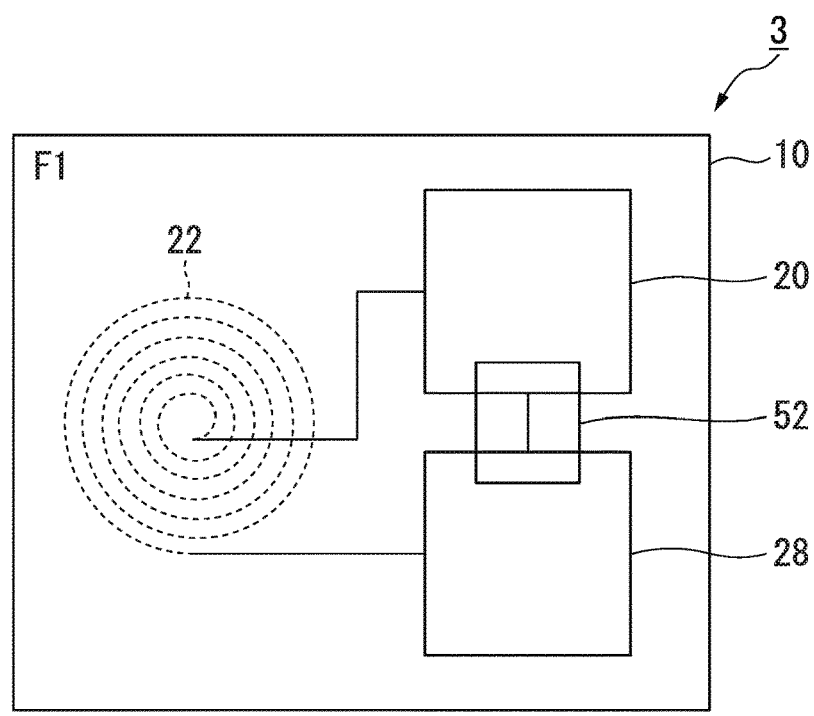
FIG. 12 is a view of the displacement sensor shown FIG. 11, seen from the first surface side of the board.

FIG. 12 is a view of the displacement sensor 3 shown FIG. 11, seen from the first surface F1 side of the board 10. As shown in FIG. 12, the IC 20 and reducer 28 on the first surface F1 of the board 10 may be disposed at positions that do not oppose the coil 22 disposed on the second surface F2 (positions at which the IC 20 and reducer 28 do not overlap with the coil 22). By doing this, the effect of the IC 20 and the reducer 28 on the measurement results of the coil 22 can be reduced. The interconnection extending to the coil 22 from the reducer 28 may be connected to the outer side of the concentric circles constituted by the wiring of the coil 22, and the interconnection extending to the coil 22 from the IC 20 may be connected to the inside of the concentric circles constituted by the wiring of the coil 22. This enables a shortening of the interconnection between the IC 20 and reducer 28, and the coil 22.

According to the displacement sensor 3 of the third embodiment described above, the strengths of the fundamental waveform and harmonics included in a signal indicating the oscillation frequency of the oscillator circuit can be reduced with a low cost and also with a simple constitution. By adding a magnetic material such as ferrite or the like to the noise reducer 24 the oscillation frequency of the oscillator circuit is reduced. By providing the resistance 50, the oscillation frequency of the oscillator circuit is increased. Given this, the oscillation frequency of the oscillator circuit can be controlled by adjusting the type and the amount of magnetic material added to the noise reducer 24 and the resistance value of the resistance 50.

In the case of a widely manufactured and sold IC 20 outputting a high-strength electromagnetic signal, by providing the above-noted resistance 50, the radiated electromagnetic field strength can be adjusted as appropriate for the application. Although the above-noted third embodiment has been described for the example in which the displacement sensor 3 includes both the noise reducer 24 and the resistance 50, for example, in the case in which there is only a small amount of harmonics, the resistance 50 only may be provided.

While a number of embodiments of the present inventions have been described, these embodiments have been presented by way of example only, and are not intended to limit the scope of the inventions. Indeed, these embodiments may be embodied in a variety of other forms, furthermore, various omissions, substitutions and changes in the form of these embodiments may be made without departing from the spirit of the inventions. The accompanying claims and their equivalents are intended to cover such embodiments or modifications as would fall within the scope and spirit of the inventions.

REFERENCE SINGS LIST 1, 3 Displacement sensor
2 Distance adjustment apparatus
20 IC
22 Coil
24 Noise reducer (reducer)
26 Inverter
28 Reducer
30 Frequency detector
32 Frequency counter
34 Output
40 Controller
50 Resistance
52 Noise shield
100 Actuator (distance adjuster)

The invention claimed is:
1. A displacement sensor comprising:
   a coil;
   an inverter electrically connected to the coil, the inverter being configured to generate an oscillation signal;
   a noise reducer electrically connected between the coil and an output terminal of the inverter, the noise reducer being configured to reduce the strength of the oscillation signal, and
   a frequency detector electrically connected to the inverter, the frequency detector being configured to detect an oscillation frequency of an oscillator circuit in response to a distance between a measurement target and the coil, the oscillator circuit comprising the coil, the inverter, and the noise reducer and having the oscillation frequency of 30 MHz or higher.

2. The displacement sensor according to claim 1, wherein the noise reducer is configured to reduce the strength of the oscillation signal above a prescribed frequency.

3. The displacement sensor according to claim 2, wherein the noise reducer comprises a magnetic material.

4. The displacement sensor according to claim 3, wherein the magnetic material comprises ferrite.

5. The displacement sensor according to claim 1, wherein the noise reducer comprises a resistance configured to reduce the strength of a fundamental waveform and a harmonic included in the oscillation signal.

6. The displacement sensor according to claim 1, wherein the frequency detector comprises a frequency counter configured to count the number of times that a signal value of the oscillation signal that varies its frequency in response to the distance between the measurement target and the coil has exceeded a threshold and derive the oscillation frequency of the oscillator circuit based on the counted number of times.

7. The displacement sensor according to claim 1, further comprising:
   an output of the frequency detector configured to output to the outside as a digital signal a value indicating the distance between the measurement target and the coil based on the oscillation frequency detected by the frequency detector.

8. The displacement sensor according to claim 1, wherein the inverter and the frequency detector are constituted by one hardware, the coil and the noise reducer are disposed outside the hardware, and the noise reducer is connected to an output terminal of hardware.

9. The displacement sensor according to claim 8, wherein the noise reducer is disposed closer to the hardware than the coil.

10. The displacement sensor according to claim 8, further comprising:
    a noise shield configured to cover at least an interconnection connecting the hardware to the noise reducer.

11. The displacement sensor according to claim 8, further comprising:
    a board, on which the coil, the hardware, and the noise reducer are disposed,
    wherein the hardware and the noise reducer are disposed on a first surface of the board and the coil is disposed on a second surface of the board opposite to the first surface of the board.

12. The displacement sensor according to claim 8, wherein the noise reducer comprises:
    a magnetic material configured to reduce the strength of a harmonic included in the oscillation signal; and
    a resistance configured to reduce the strength of a fundamental waveform and a harmonic included in the oscillation signal, wherein the resistance and the magnetic material are disposed sequentially from the side closer to the output terminal of the hardware between the output terminal of the hardware and the coil.

13. A distance adjustment apparatus comprising:
the displacement sensor according to claim 1;
a distance adjuster configured to adjust the distance between the measurement target and the displacement sensor; and
a controller configured to control the distance adjuster to set the distance between the measurement target and the displacement sensor to a desired distance based on a value input from the displacement sensor.

* * * * *